United States Patent
Goder (10) Patent No.: US 7,994,760 B2
(45) Date of Patent: Aug. 9, 2011

(54) REGULATION SCHEME FOR A CHARGE PUMP

(75) Inventor: Dimitry Goder, San Jose, CA (US)

(73) Assignee: Integrated Device Technologies, Inc., San Jose, CA (US)

( * ) Notice: Subject to any disclaimer, the term of this patent is extended or adjusted under 35 U.S.C. 154(b) by 231 days.

(21) Appl. No.: 12/484,169

(22) Filed: Jun. 12, 2009

(65) Prior Publication Data

US 2010/0315050 A1    Dec. 16, 2010

(51) Int. Cl.
  *G05F 1/577* (2006.01)
  *G05F 1/40* (2006.01)
(52) U.S. Cl. .......... 323/267; 323/225; 323/285; 307/31
(58) Field of Classification Search .......... 323/222, 323/225, 267, 271, 282, 284, 285; 327/536; 307/31
  See application file for complete search history.

(56) References Cited

U.S. PATENT DOCUMENTS

| 5,617,015 A * | 4/1997 | Goder et al. ......... 323/282 |
| 6,853,171 B2 * | 2/2005 | May ................. 323/283 |
| 7,298,116 B2 * | 11/2007 | Sluijs ............... 323/222 |
| 7,851,940 B2 * | 12/2010 | Mahin et al. .......... 323/267 |
| 7,888,989 B2 * | 2/2011 | Lin et al. ............ 327/536 |

* cited by examiner

*Primary Examiner* — Jessica Han
(74) *Attorney, Agent, or Firm* — Hayes and Boone LLP (57) ABSTRACT

A boost regulator system for regulating one or more output voltages includes, a first pump element coupled to receive a first input voltage, a first switching device coupled to the first pump element, the first switching device causing a finite amount of energy to be stored in the first pump element in response to a first control signal. The system further includes, a first capacitor coupled to the first pump element and the first switching device, the first capacitor storing the finite amount of energy and generating a first output voltage in response to the finite amount of energy. A boost controller (BC) coupled to receive the first output voltage, the boost controller further configured to regulate the first output voltage by generating the first control signal. The system further includes, a second switching device coupled to a second capacitor, the second switching device further causing a second voltage to develop across the second capacitor in response to a second control signal, a third capacitor coupled to the first pump element and the second switching device, the third capacitor further generating a third output voltage in response to the finite amount of energy, and a linear controller (LC) coupled to receive the third output voltage, the BC further configured to regulate the third output voltage by generating the second control signal.

23 Claims, 6 Drawing Sheets

REGULATION SCHEME FOR A CHARGE PUMP

TECHNICAL FIELD

This invention relates generally to the field of electronic circuits, more particularly, to methods and systems for regulating output voltages in charge pumps that may be used in various electronic circuits.

DISCUSSION OF RELATED ART

With an increasing demand for smaller and more efficient electronic systems, current system designs are routinely constrained by a limited number of readily available power supply voltages. For example, a portable computer system powered by a conventional battery having a limited power supply voltage. For proper operation, different components of the system, such as a display device, processor, and memory components can employ diverse technologies which may require power to be supplied at various operating voltages. In some cases, components may require operating voltages of a greater magnitude than the power supply voltage and, in other cases, components may require voltages of reversed polarity. In addition to constraints on the number of power supply voltages available for system design, there is also an increasing demand for reducing magnitudes of the power supply voltages.

To fulfill the various operating voltage requirements, systems can include various power conversion circuitry. One such power conversion circuit that is currently employed is a charge pump. However, charge pumps currently being employed are less efficient and have not been able keep up with the technological advances in Very Large Scale Integrated devices.

Inefficiencies in conventional charge pumps can lead to reduced system capability and lower system performance in both battery and non-battery operated systems. Inefficiency can adversely affect system capabilities, for example, limited battery life, excess heat generation, and high operating costs. Examples of lower system performance can include low speed operation, excessive operating delays, loss of data, limited communication range, and inability to operate over wide variations in ambient conditions including ambient light level and temperature.

Therefore, with an increasing number of applications utilizing battery powered systems, such as notebook computers, portable telephones, security devices, battery-backed data storage devices, remote controls, instrumentation, and other such devices, there is a need for highly-efficient and reliable charge pump circuits.

SUMMARY

Consistent with some embodiments of the present invention, a boost regulator system for regulating one or more output voltages includes, a first pump element coupled to receive a first input voltage, a first switching device coupled to the first pump element, the first switching device causing a finite amount of energy to be stored in the first pump element in response to a first control signal. The system further includes, a first capacitor coupled to the first pump element and the first switching device, the first capacitor storing the finite amount of energy and generating a first output voltage in response to the finite amount of energy. A boost controller (BC) coupled to receive the first output voltage, the boost controller further configured to regulate the first output voltage by generating the first control signal.

The system further includes, a second switching device coupled to a second capacitor, the second switching device further causing a second voltage to develop across the second capacitor in response to a second control signal, a third capacitor coupled to the first pump element and the second switching device, the third capacitor further generating a third output voltage in response to the finite amount of energy, and a linear controller (LC) coupled to receive the third output voltage, the BC further configured to regulate the third output voltage by generating the second control signal.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

The accompanying drawings, which are incorporated in and constitute a part of this specification, illustrate embodiments of the invention and, together with the description, serve to explain the principles of the invention.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

In the following description and claims, the terms "coupled" and "connected," along with their derivatives, may be used. It should be understood that these terms are not intended as synonyms for each other. Rather, in particular embodiments, "connected" and/or "coupled" may be used to indicate that two or more elements are in direct physical or electronic contact with each other. However, "coupled" may also mean that two or more elements are not in direct contact with each other, but yet still cooperate, communicate, and/or interact with each other.

Figure 1:
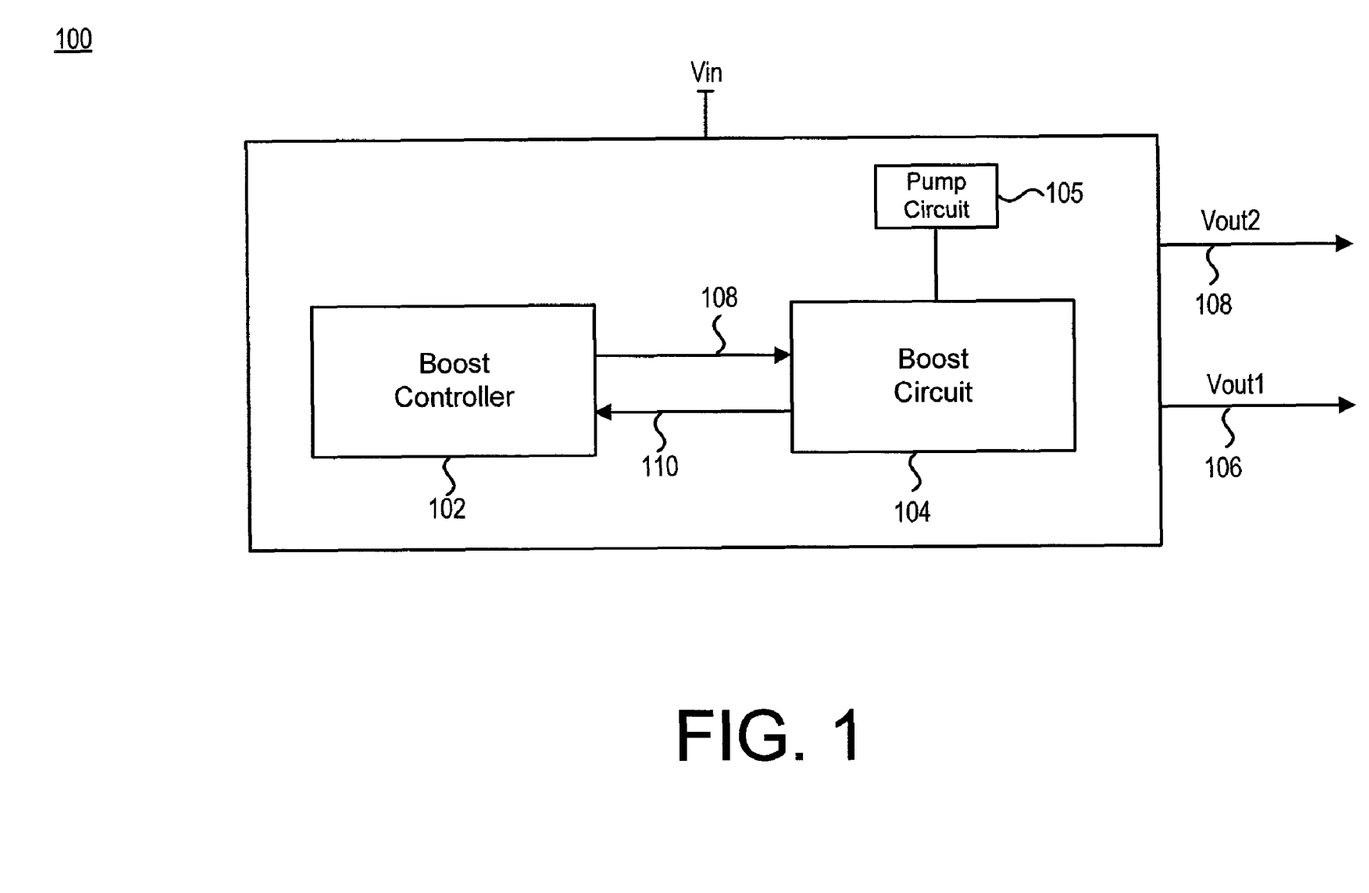
FIG. 1 illustrates a high-level block diagram of a boost regulator unit consistent with some embodiments of the present invention.

To fulfill the various operating voltage requirements, an electronic system can use a boost regulator unit to create and switch between multiple power supplies that can be generated from a single power supply input. FIG. 1 illustrates a block diagram of an exemplary boost regulator unit (BRU) 100 consistent with some embodiments of the present invention. As shown in FIG. 1, BRU 100 can include a boost controller (BC) 102, a charge pump circuit (CPC) 105, a boost circuit (BTC) 104, and output terminal 106 and 108. As can be seen in FIG. 1, BRU 100 can be further coupled to receive an input voltage ($V_{IN}$). Typically, input voltage $V_{IN}$ can be received from a low voltage direct current (DC) and/or alternating current (AC) power supply.

During normal operation of BRU 100, BTC 104 can receive input voltage ($V_{IN}$) and generate an appropriate boost output voltage ($V_{OUT1}$) across output terminal 106 and a charge pump voltage $V_{OUT2}$ across output terminal 108. As can be seen in FIG. 1, charge pump voltage $V_{OUT2}$ can be dependent on boost voltage $V_{OUT1}$. Based on the type of application, $V_{OUT1}$ can be generated across output terminal 106 to include one or more positive and/or negative voltages. Typically, BRU 100 can be configured to generate output voltage ($V_{OUT1}$) such that:

$V_{OUT1} = N \times V_{IN}$ (where N is a positive integer)

and/or $V_{OUT1} = -(N \times V_{IN})$.

For convenience, FIG. 1 illustrates BRU 100 as including two output terminal 106 and 108. However, it should be understood that in practice BRU 100 can include any number of output terminals that can generate any number of output voltages such as exemplary output voltages ($V_{OUT1}$ and $V_{OUT2}$). Therefore, the present disclosure is not limited in the number of output terminals or output voltages that can be included and/or supported by a system consistent with the present invention.

During normal operation of an electronic system that can include BRU 100, operating conditions (such as input voltage levels, output load currents, or other such conditions) can change which can further cause output voltage $V_{OUT1}$ and $V_{OUT2}$ to change. Because output voltages $V_{OUT1}$ and $V_{OUT2}$ can include one or more positive and/or negative voltages that can be of a magnitude greater than input voltage $V_{IN}$, any change in voltages $V_{OUT1}$ and/or $V_{OUT2}$ can affect the operation of other devices in the electronic system that can further result in loss of efficiency, unreliable performance, and/or system damage. Therefore, in order to avoid changes in output voltages $V_{OUT1}$ and $V_{OUT2}$, in some embodiments, BC 102 can be coupled to BTC 104 via a control line 108 and a feedback line 110, to further regulate output voltage $V_{OUT1}$ such that output voltages $V_{OUT1}$ and/or $V_{OUT2}$ can be held at a desired operating level.

Figure 2:
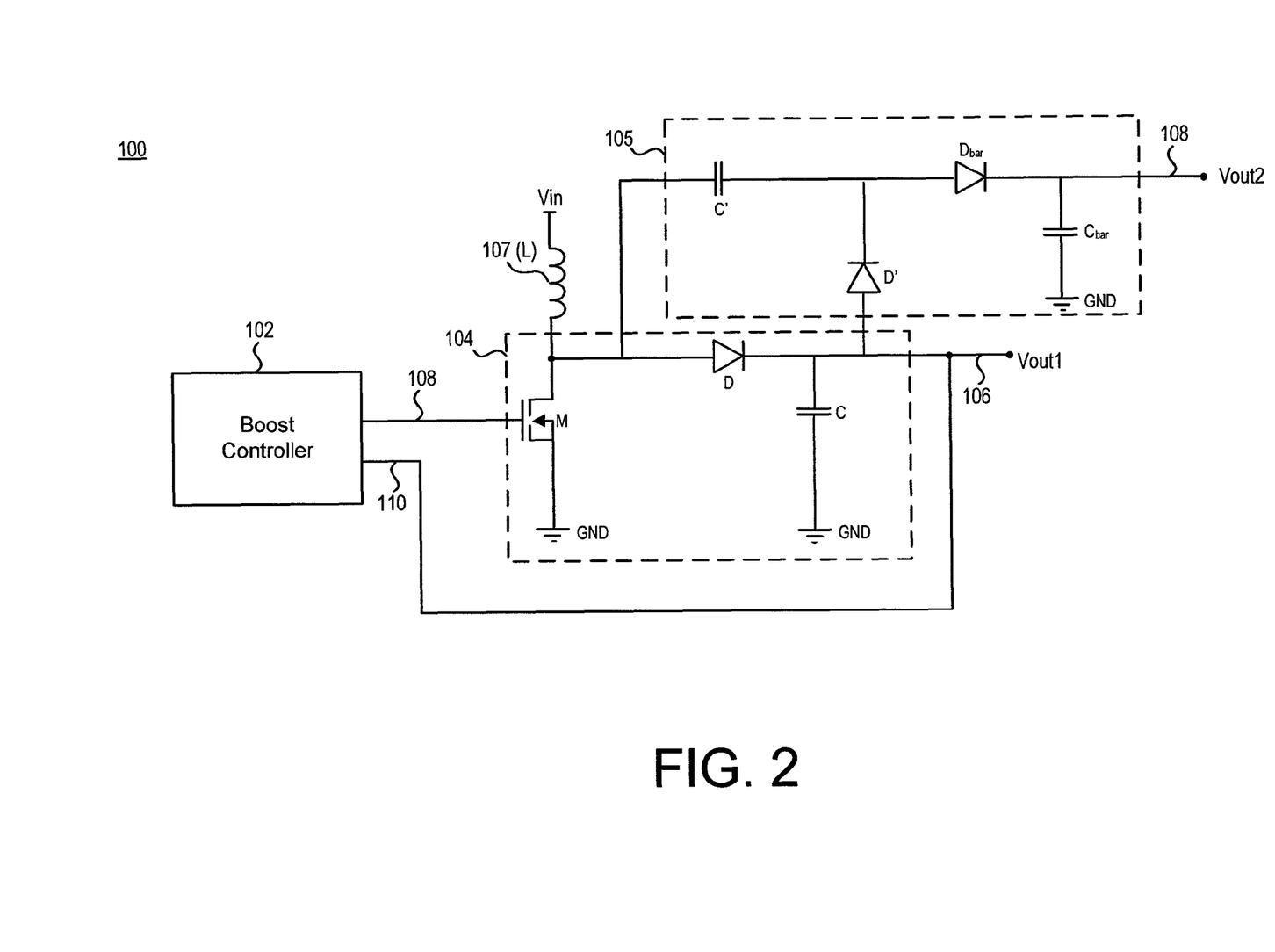
FIG. 2 illustrates a schematic of a boost regulator unit consistent with some embodiments of the present invention.

FIG. 2 illustrates a schematic diagram of exemplary BRU 100 consistent with some embodiments of the present invention. As is shown in FIG. 2, BTC 104 can be coupled to a pump element 107 and can include a switching device such as a metal oxide semiconductor field effect transistor (MOSFET) M, a diode D and an output charging capacitor C. For convenience, FIG. 2 depicts pump element 107 as an inductive element L. However, it should be understood that in practice there can be any type (inductive or capacitive) and/or number of pump elements that can be included in a given system such as exemplary BRU 100. Therefore, the present disclosure is not limited in the type of pump element that can be included and supported by a system consistent with the present invention.

As shown in FIG. 2, the gate of transistor M can be coupled to BC 102 via control line 108 and boost output voltage $V_{OUT1}$ can be generated across capacitor C via output terminal 106. BC 102 can be further coupled to receive output voltage $V_{OUT1}$ via feedback line 110. BRU 100 can further include charge pump circuit (CPC) 105. CPC 105 can further include capacitors (C' and $C_{bar}$) and diodes (D' and $D_{bar}$) coupled together as shown in FIG. 2. Charge pump voltage $V_{OUT2}$ can be generated across capacitor $C_{bar}$ across output terminal 108.

During normal operation, BC 102 can control the operation of transistor M by applying a control signal via control line 108. The control signal applied by BC 102 can include a voltage signal, a frequency modulated control signal, a pulse width modulated control signal or any such signal that can turn transistor M on/off and/or control the mode of operation of transistor M. The turning on of transistor M (by BC 102) can cause a current to flow from input voltage $V_{IN}$ through inductive element L and transistor M, and down to a ground (GND). While transistor M is on, inductive element L can store the energy generated by the flow of current. The turning off of transistor M can cause the voltage at the drain of transistor M to increase which in turn can cause a charge to be transferred to capacitor C via diode D. Diode D acts like a one-way valve that can prevent the charge transferred from transistor M to capacitor C from flowing backwards to transistor M. Similarly, diodes D' and $D_{bar}$ can act as one-way valves and can cause a charge to build up across capacitor $C_{bar}$. Therefore, by periodically turning on/off transistor M, a charge can build up in capacitor C and $C_{bar}$, and output voltage $V_{OUT1}$ and $V_{OUT2}$ can be generated.

As discussed above, BC 102 can be configured to regulate output voltage $V_{OUT1}$ (and $V_{OUT2}$). BC 102 can control transistor M via control line 108 such that a desired output voltage is generated and/or maintained across output terminal 106. For example, if output voltage $V_{OUT1}$ falls below a desired level, BC 102 can sense this decrease via feedback line 110. In response to sensing a decrease in output voltage $V_{OUT1}$, BC 102 can control transistor M (by driving M in a mode of operation) such that the charge being delivered to output capacitor C can increase. This action can in turn increase output voltage $V_{OUT1}$ to compensate for the initial drop in the output voltage. If, on the other hand, output voltage $V_{OUT1}$ rises above a desired level, BC 102 can sense this increase, and can accordingly control transistor M to decrease the charge being delivered to output capacitor C. This action can in turn decrease output voltage $V_{OUT1}$ to compensate for the initial rise in the output voltage.

For convenience, FIG. 2 depicts a switching device M as a N-channel MOSFET. However, it should be understood that in practice there can be any type of switching device (such as N or P channel MOSFET's, bipolar transistors or other such switching devices) that can be included in a given system such as exemplary BRU 100. Therefore, the present disclosure is not limited in the type or number of switching devices that can be included and supported by a system consistent with the present invention.

Figure 3:
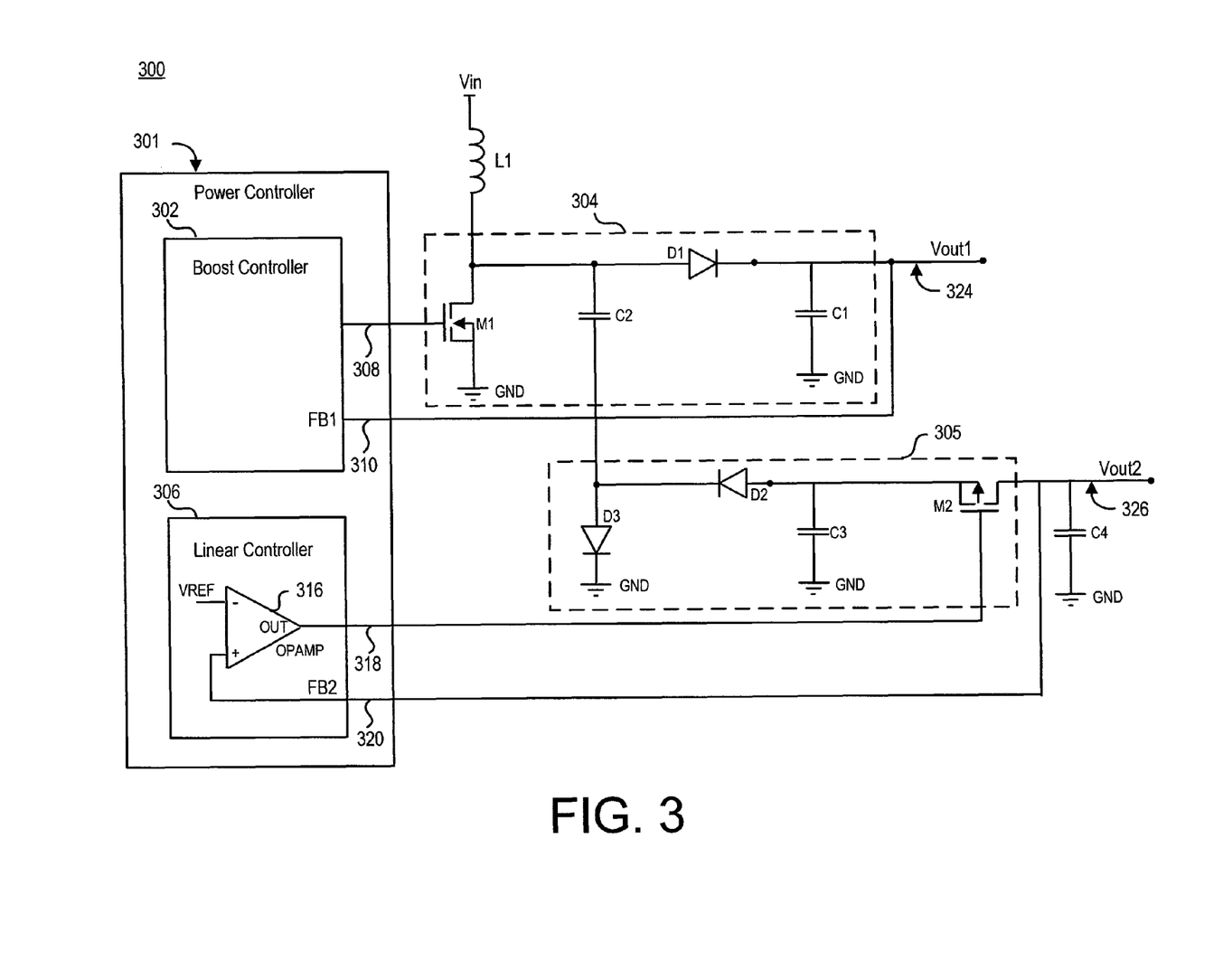
FIGS. 3 and 4 illustrate schematics of negative regulated charge pump circuits consistent with some embodiments of the present invention.

As discussed earlier, a boost regulator can be configured to generate multiple positive and/or negative output voltages. FIG. 3 illustrates a schematic diagram of an exemplary BRU 300 that can include a negative regulated charge pump consistent with some embodiments of the present invention. As shown in FIG. 3, BRU 300 can include a BC 302, a linear controller (LC) 306, charge pump circuit (CPC) 305 and boost circuit (BTC) 304. In some embodiments, BC 302 can be similar if not identical to BC 102 discussed with respect to FIG. 2.

BTC 304 can include a switching device such as transistor $M_1$, diode $D_1$ and capacitor $C_1$. In some embodiments, BTC 304 can be similar if not identical to BTC 104 as discussed with respect to FIG. 2. As shown in FIG. 3, BC 302 can be coupled to the gate of transistor $M_1$ and to an output terminal 324 via a control line 308 and a feedback line 310, respectively. In a manner similar to that discussed with respect to FIG. 2, a first output voltage $V_{OUT1}$ generated across output terminal 324 (of BTC 304) can be regulated by BC 302. In some embodiments, first output voltage $V_{OUT1}$ can be similar if not identical to voltage $V_{OUT1}$ discussed with respect to FIG. 2.

CPC 305 can include a switching device such as transistor $M_2$, diodes $D_2$ and $D_3$, and capacitors $C_2$ and $C_3$ coupled together as shown in FIG. 3. As will be discussed in detail below, a second output voltage $V_{OUT2}$ can be generated across an output terminal 326 (of CPC 305). In some embodiments, output voltage $V_{OUT2}$ can have a negative magnitude with respect to GND, and $V_{OUT2}$ can further have an absolute value less than or equal to $V_{OUT1}$. In some embodiments, a capacitor $C_4$ can be coupled across output terminal 326 of CPC 305 for filtering out high frequency noise, voltage spikes, and/or other unwanted signals present in the input voltage $V_{IN}$.

In some embodiments, BRU 300 can include LC 306 to further regulate output voltage $V_{OUT2}$ generated across output terminal 326. LC 306 can further include an operational amplifier 316 that can be coupled to receive a reference voltage $V_{REF}$ at its inverting input and second output voltage $V_{OUT2}$ at its non-inverting input (via a feedback line 320). In some embodiments, Voltage $V_{REF}$ can include a voltage that can be supplied by an internal bandgap generator.

As shown in FIG. 3, LC 306 can be further coupled to the gate of transistor $M_2$ and output terminal 326 via control line 318 and feedback line 320, respectively. LC 306 can apply a control voltage signal across a control line 318 that can further control the operation of transistor $M_2$. The control voltage signal applied by LC 306 can include any signal that can turn transistor $M_2$ on/off and/or control the mode of operation of transistor $M_2$. In some embodiments, control voltage signal applied by LC 306 can be a negative voltage signal. In some embodiments, BC 302 and LC 306 can be included as part of a single power controller unit (PCU) 301.

During normal operation, BC 302 can apply a control signal via control line 308 that can control the operation of transistor $M_1$. In a manner similar to that discussed with respect to FIG. 2, the turning on of transistor $M_1$ can cause a current to flow from input voltage $V_{IN}$ through inductive element $L_1$ and transistor $M_1$ and down to GND. While transistor $M_1$ is on, inductive element $L_1$ can store the energy generated by the flow of current. The turning off of transistor $M_1$ can cause the voltage at the drain of transistor $M_1$ to increase which in turn can cause a charge (energy) to be transferred to capacitor $C_1$ via diode $D_1$. Diode $D_1$ acts like a one-way valve that prevents the charge transferred from transistor $M_1$ to capacitor $C_1$ from flowing backwards to transistor $M_1$. Therefore, by periodically controlling the operation of transistor $M_1$, a charge can build up in capacitor $C_1$ and output voltage $V_{OUT1}$ can be generated across output terminal 324. In a manner similar to that discussed with respect to FIG. 2, BC 302 can be configured to regulate output $V_{OUT1}$ generated across output terminal 324 such that voltage $V_{OUT1}$ can be held at a desired operating level.

Simultaneously, as voltage $V_{OUT1}$ is generated across capacitor $C_1$, LC 306 can control the operation of transistor $M_2$ by applying a control voltage signal (discussed above) at the gate of transistor $M_2$ via control line 318. When transistor $M_2$ is turned on, a charge can build up across capacitor $C_3$ which in turn can result in second output voltage $V_{OUT2}$ being generated via output terminal 326. Diodes $D_2$ and $D_3$ act like a valves that prevent the current flow in CPC 304 from affecting the build up of charge in capacitor $C_3$.

As can be seen in FIG. 3, because transistor $M_2$ is coupled in series between capacitors $C_3$ and $C_4$, amplifier 316 can generate a negative voltage across control line 318 to drive the gate of transistor $M_2$. Therefore, the voltage across capacitor $C_3$ can have a negative magnitude relative to ground. As is shown in FIG. 3, voltage $V_{OUT2}$ can be further sensed by LC 306 via feedback line 320. Furthermore, LC 306 can regulate output voltage $V_{OUT2}$ by comparing voltage $V_{OUT2}$ with reference voltage $V_{REF}$ (via amplifier 316) and accordingly controlling the gate voltage across transistor $M_2$ (via control line 318). For example, if second output voltage $V_{OUT2}$ falls below a desired level, LC 306 can sense this decrease via feedback line 320. In response to sensing a decrease in output voltage $V_{OUT2}$, LC 306 via amplifier 316 can control the voltage along control line 318 to ensure that the gate of transistor $M_2$ is held at the appropriate driving voltage level that can cause an increase in charge transferred to capacitor $C_3$. This action can in turn increase output voltage $V_{OUT2}$ to compensate for the initial drop in the output voltage. If, on the other hand, second output voltage $V_{OUT2}$ rises above a desired level, LC 306 can sense this increase, and can accordingly control the voltage at the gate of transistor $M_2$ to decrease the charge transferred to capacitor $C_3$. This action can in turn decrease second output voltage $V_{OUT2}$ to compensate for the initial rise in the output voltage. In some embodiments, to further optimize voltage scaling, one or feedback resistors and/or buffers can be coupled along feedback line 320.

For convenience, FIG. 3 depicts a switching devices $M_1$ and $M_2$ as N-channel MOSFET's. However, it should be understood that in practice there can be any type of switching device (such as N or P channel MOSFET's, bipolar transistors or other such switching devices) that can be included in a given system such as exemplary BRU 300. Therefore, the present disclosure is not limited in the type or number of switching devices that can be included and supported by a system consistent with the present invention.

Figure 4:
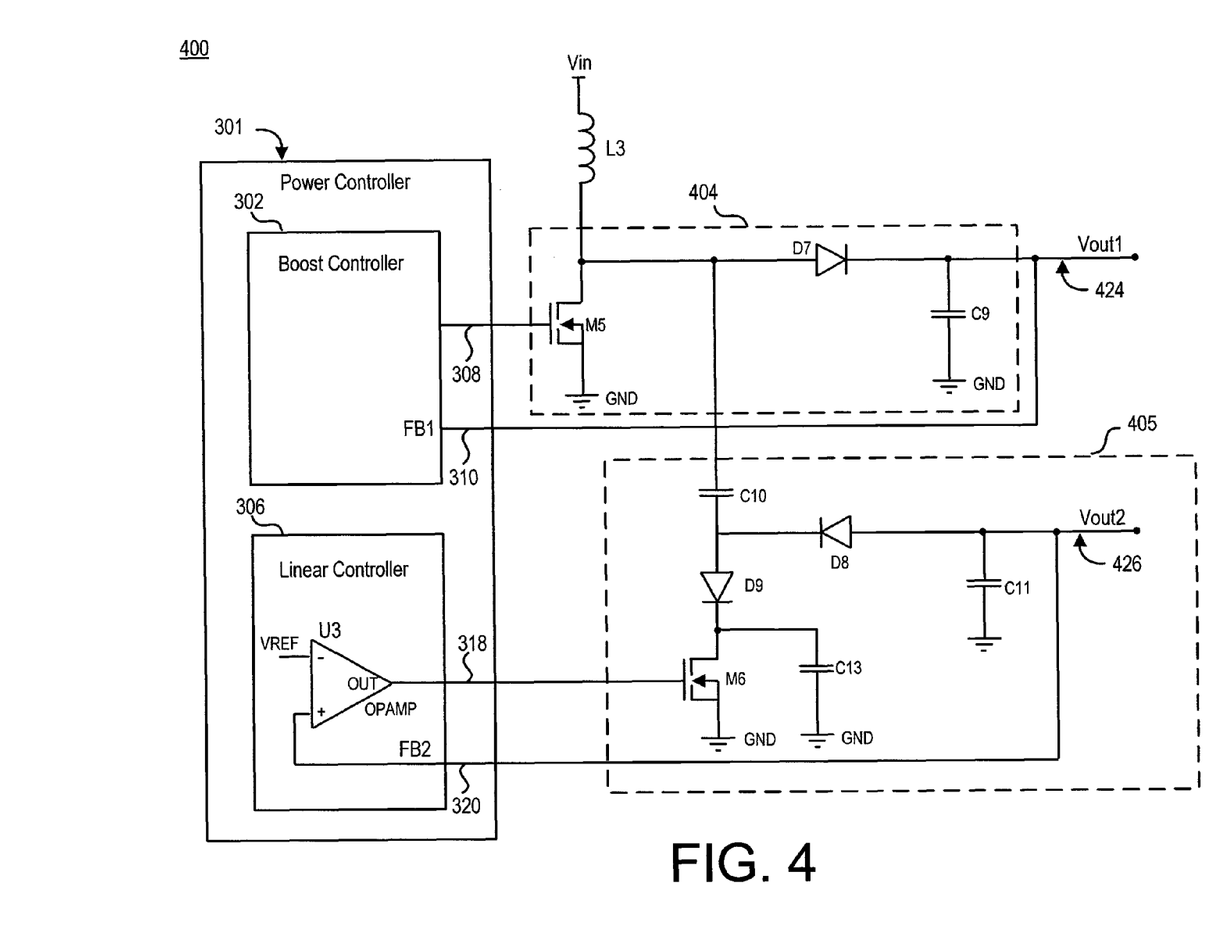

FIG. 4 illustrates a schematic diagram of an exemplary BRU 400 that can further optimize the regulation of negative output voltages of a charge pump circuit consistent with some embodiments of the present invention. As shown in FIG. 4, BRU 300 can include BC 302, LC 306, charge pump circuits (CPC) 405 and boost circuit (BTC) 404.

BTC 404 can include a switching device such as transistor $M_5$, diode $D_7$ and capacitor $C_9$. In some embodiments, transistor $M_5$, diode $D_7$ and capacitor $C_9$ can be similar if not identical to transistor $M_1$, diode $D_1$ and capacitor $C_1$, respectively, and BTC 404 can be similar to BTC 304 as discussed with respect to FIG. 3. As shown in FIG. 4, BC 302 can be coupled to the gate of transistor $M_5$ and to an output terminal 424 via control line 308 and feedback line 310, respectively. In a manner similar to that discussed with respect to FIG. 3, first output voltage $V_{OUT1}$ generated across output terminal 424 (of BTC 404) can be regulated by BC 302. In some embodiments, first output voltage $V_{OUT1}$ can be similar if not identical to voltage $V_{OUT1}$ discussed with respect to FIG. 2.

CPC 405 can include a switching device such as transistor $M_6$, diodes $D_8$ and $D_9$, and capacitors $C_{10}$ and $C_{11}$ coupled together as shown in FIG. 4. As will be discussed in detail below, a second output voltage $V_{OUT2}$ can be generated across an output terminal 426 (of CPC 405). In some embodiments, output voltage $V_{OUT2}$ can have a negative magnitude with respect to GND and $V_{OUT2}$ can further have an absolute value less than or equal to $V_{OUT1}$. In some embodiments, a capacitor $C_{13}$ can be coupled in series with diode $D_9$ as shown in FIG. 4. Capacitor $C_{13}$ can act as a high frequency filter that can filter out noise, voltage spikes and/or other unwanted signals present in the power supply input voltage. In some embodiments, capacitor $C_{13}$ can also allow transistor $M_6$ to have a slower response to the effects caused by the switching of transistor $M_5$.

In some embodiments, BRU 300 can include LC 306 to further regulate output voltage $V_{OUT2}$ generated across output terminal 426. In a manner similar to that discussed with respect to FIG. 3, LC 306 can further include an operational amplifier 316 that can be coupled to receive a reference voltage $V_{REF}$ at its inverting input and second output voltage $V_{OUT2}$ at its non-inverting input (via feedback line 320).

As shown in FIG. 4, LC 306 can be further coupled to the gate of transistor $M_6$ and output terminal 426 via control line 318 and feedback line 320, respectively. In a manner similar to that discussed with respect to FIG. 3, LC 306 can apply a control voltage signal across a control line 318 that can further control the operation of transistor $M_6$.

During normal operation, BC 302 can apply a control signal via control line 308 that can control the operation of transistor $M_5$. In a manner similar to that discussed with respect to FIG. 3, the turning on of transistor $M_5$ can cause a current to flow from input voltage $V_{IN}$ through inductive element $L_3$ and transistor $M_1$ and down to GND. While transistor $M_5$ is on, inductive element $L_3$ can store the energy generated by the flow of current. The turning off of transistor $M_5$ can cause the voltage at the drain of transistor $M_5$ to increase which in turn can cause a charge to be transferred to capacitor $C_9$ via diode $D_7$. Diode $D_7$ can act like a valve that prevents the charge transferred from transistor $M_5$ to capacitor $C_9$ from flowing backwards to transistor $M_5$. Therefore, by periodically controlling the operation of transistor $M_5$, a charge can build up in capacitor $C_9$ and output voltage $V_{OUT1}$ can be generated across output terminal 424. In a manner similar to that discussed with respect to FIG. 3, BC 302 can be configured to regulate output $V_{OUT1}$ generated across output terminal 424 such that voltage $V_{OUT1}$ can be held at a desired operating level.

Simultaneously, as voltage $V_{OUT1}$ is generated across capacitor $C_9$, LC 306 can control the operation of transistor $M_6$ by applying a control voltage signal (discussed above) at the gate of transistor $M_6$ via control line 318. Because transistor $M_6$ is coupled in series with diode $D_9$, transistor $M_6$ can act as a variable resistor that can control the voltage across capacitor $C_{13}$. When transistor $M_6$ is turned on a charge can build up across capacitor $C_{13}$ which in turn can result in a positive voltage being developed across capacitor $C_{13}$. Furthermore, as a positive voltage develops across capacitor $C_{13}$, the absolute value of second output voltage $V_{OUT2}$ generated via output terminal 426 can be reduced. Therefore, a negative voltage can be generated across output terminal 426.

As is shown in FIG. 4, voltage $V_{OUT2}$ can be further sensed by LC 306 via feedback line 320. Furthermore, LC 306 can regulate output voltage $V_{OUT2}$ by comparing voltage $V_{OUT2}$ with reference voltage $V_{REF}$ (via amplifier 316) and accordingly controlling the gate voltage across transistor $M_6$ (via control line 318). For example, if second output voltage $V_{OUT2}$ falls below a desired level, LC 306 can sense this decrease via feedback line 320. In response to sensing a decrease in output voltage $V_{OUT2}$, LC 306 via amplifier 316 can control the voltage along control line 318 to ensure that the gate of transistor $M_6$ is held at the appropriate driving voltage level that can cause a decrease in charge transferred to capacitor $C_{13}$. This action can in turn increase output voltage $V_{OUT2}$ to compensate for the initial drop in the output voltage. If, on the other hand, second output voltage $V_{OUT}$ rises above a desired level, LC 306 can sense this increase, and can accordingly control the voltage at the gate of transistor $M_6$ to increase the charge transferred to capacitor $C_3$. This action can in turn decrease second output voltage $V_{OUT2}$ to compensate for the initial rise in the output voltage. In some embodiments, to further optimize voltage scaling, one or more feedback resistors and/or buffers can be coupled along feedback line 320.

For convenience, FIG. 4 depicts a switching devices $M_5$ and $M_6$ as N-channel MOSFET's. However, it should be understood that in practice there can be any type of switching device (such as N or P channel MOSFET's, bipolar transistors or other such switching devices) that can be included in a given system such as exemplary BRU 300. Therefore, the present disclosure is not limited in the type or number of switching devices that can be included and supported by a system consistent with the present invention. In some embodiments, in order to further simplify implementation of BRU 400, switching devices $M_5$ and/or $M_6$ can be externally coupled to BRU 400.

Figure 5:
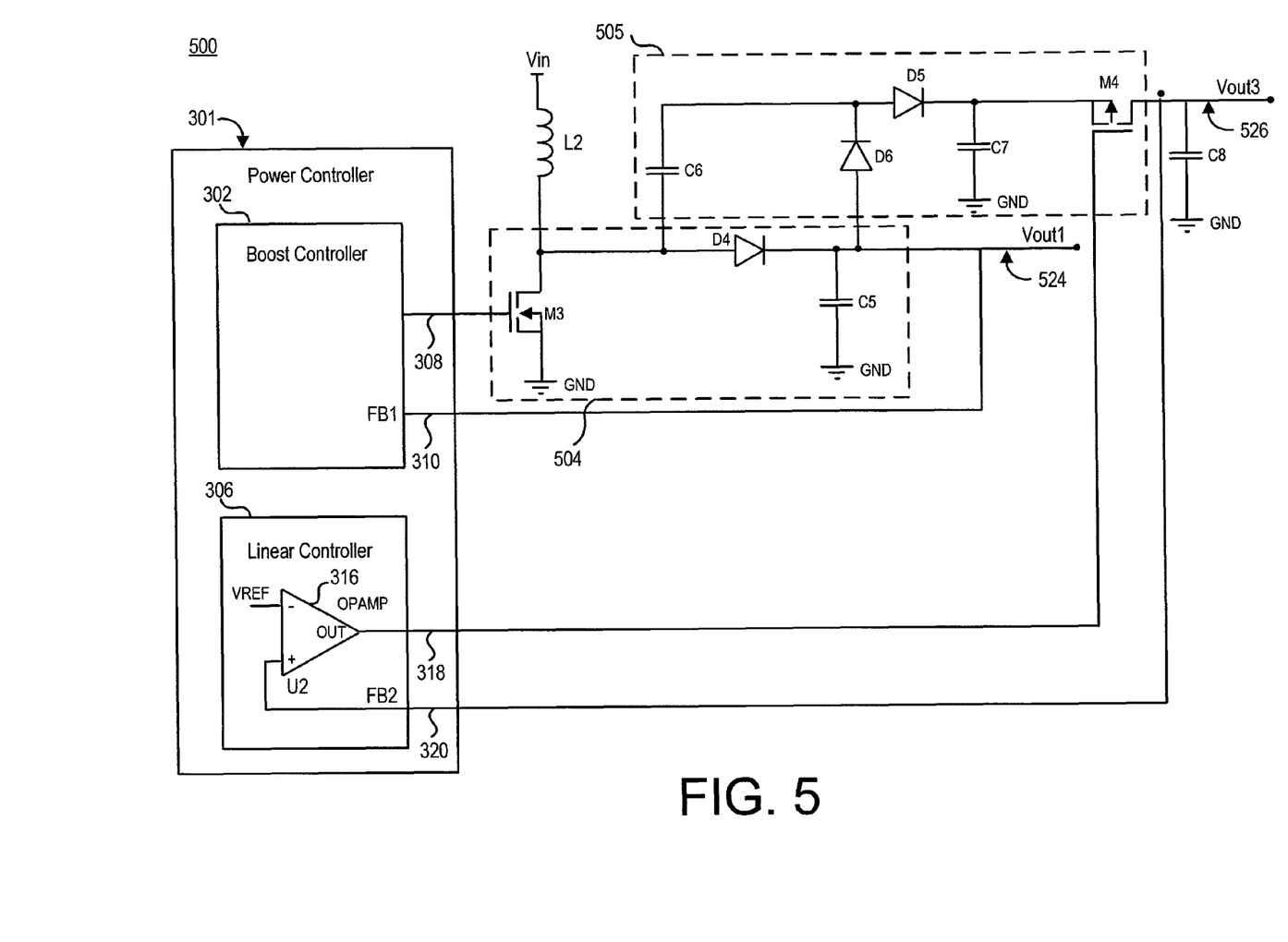
FIGS. 5 and 6 illustrate schematics of positive regulated charge pump circuits consistent with some embodiments of the present invention.

FIG. 5 illustrates a schematic diagram of an exemplary BRU 500 that can include a positive regulated charge pump consistent with some embodiments of the present invention. As shown in FIG. 5, BRU 500 can include BC 302, linear controller (LC) 306, CPC 505 and BTC 504.

BTC 504 can include a switching device such as transistor $M_3$, diode $D_4$ and capacitor $C_5$. In some embodiments, BTC 504 can be similar if not identical to BTC 104 as discussed with respect to FIG. 2. As shown in FIG. 5, BC 302 can be coupled to the gate of transistor $M_3$ and to an output terminal 524 via a control line 308 and a feedback line 310, respectively. In a manner similar to that discussed with respect to FIG. 2, a first output voltage $V_{OUT1}$ generated across output terminal 524 (of BTC 504) can be regulated by BC 302. In some embodiments, first output voltage $V_{OUT1}$ can be similar if not identical to voltage $V_{OUT}$ discussed with respect to FIG. 2.

CPC 505 can include a switching device such as transistor $M_4$, diodes $D_5$ and $D_6$, and capacitors $C_6$ and $C_7$ coupled together as shown in FIG. 5. As will be discussed in detail below, an output voltage $V_{OUT3}$ can be generated across an output terminal 526 (of CPC 505). In some embodiments, output voltage $V_{OUT3}$ can be generated such that:

$$V_{OUT3} = N \times V_{OUT1} \text{(where N is a positive integer)}$$

In some embodiments, a capacitor $C_8$ can be coupled across output terminal 526 of CPC 505 for filtering out noise, voltage spikes and/or other unwanted signals present in the power supply input voltage. In some embodiments, BRU 300 can include LC 306 to further regulate output voltage $V_{OUT3}$ generated across output terminal 526. In a manner similar to that discussed with respect to FIG. 3, LC 306 can further include an operational amplifier 316 that can be coupled to receive a reference voltage $V_{REF}$ at its inverting input and second output voltage $V_{OUT3}$ at its non-inverting input (via feedback line 320).

As shown in FIG. 5, LC 306 can be coupled to the gate of transistor $M_4$ and output terminal 526 via control line 318 and a feedback line 320, respectively. As will be discussed in detail below, LC 306 can further control CPC 505 to regulate output voltage $V_{OUT3}$ generated across output terminal 526.

During normal operation, BC 302 can apply a control signal via control line 308 that can cause transistor $M_3$ to periodically turn on and/or off. In a manner similar to that discussed with respect to FIG. 2, the turning on of transistor $M_3$ can cause a current to flow from input voltage $V_{IN}$ through inductive element $L_2$ and transistor $M_3$ and down to GND. While transistor $M_3$ is on, inductive element $L_2$ can store the energy generated by the flow of current. The turning off of transistor $M_3$ can cause the voltage at the drain of transistor $M_3$ to increase which in turn can cause a charge to be transferred to capacitor $C_5$ via diode $D_4$. Diode $D_4$ acts like a valve that prevents charge transferred from transistor $M_1$ to capacitor $C_1$ from flowing backwards to transistor $M_1$. Therefore, by periodically controlling the operation of transistor $M_3$, a charge can build up in capacitor $C_5$ and output voltage $V_{OUT1}$ can be generated across output terminal 524. In a manner similar to that discussed with respect to FIG. 2, in some embodiments BC 302 can be configured to regulate output $V_{OUT1}$ generated across output terminal 524 such that voltage $V_{OUT1}$ can be held at a desired operating level.

Simultaneously, as voltage $V_{OUT1}$ is generated across capacitor $C_5$, LC 306 can control the operation of transistor $M_4$ by applying a control voltage signal (discussed above) at the gate of transistor $M_4$ via control line 318. When transistor $M_4$ is turned on, a charge can build up across capacitor $C_7$ which in turn can result in output voltage $V_{OUT3}$ being generated via output terminal 526. Diodes $D_5$ and $D_6$ act like valves that prevent charge transferred from transistor $M_4$ to capacitor $C_7$ from flowing towards capacitor $C_5$.

As can be seen in FIG. 5, transistor $M_4$ is coupled in series with capacitors $C_7$ and $C_8$, and transistor $M_4$ can be exposed to output voltage $V_{OUT1}$. Because transistor M4 is also exposed to output voltage $V_{OUT1}$, output voltage $V_{OUT3}$ generated across capacitor $C_7$ can have a magnitude that can be greater than voltage $V_{OUT1}$. As is shown in FIG. 5, voltage $V_{OUT3}$ can be further sensed by LC 306 via feedback line 320. Furthermore, LC 306 can regulate output voltage $V_{OUT3}$ by comparing voltage $V_{OUT3}$ with reference voltage $V_{REF}$ (via amplifier 316) and accordingly controlling the gate voltage across transistor $M_4$ (via control line 318). For example, if output voltage $V_{OUT3}$ falls below a desired level, LC 306 can sense this decrease via feedback line 320. In response to sensing a decrease in output voltage $V_{OUT3}$, LC 306 via amplifier 316 can control the voltage at the gate of transistor $M_6$ to increase the charge transferred to capacitor $C_7$. This action can in turn increase output voltage $V_{OUT3}$ to compensate for the initial drop in the output voltage. If, on the other hand, output voltage $V_{OUT3}$ rises above a desired level, LC 306 can sense this increase, and can accordingly control the voltage at the gate of transistor $M_4$ (via control line 318) to decrease the charge transferred to capacitor $C_7$. This action can in turn decrease output voltage $V_{OUT3}$ to compensate for the initial rise in the output voltage. In some embodiments, to further optimize voltage scaling, one or more feedback resistors and/or buffers can be coupled along feedback line 320.

For convenience, FIG. 5 depicts a switching devices $M_3$ and $M_4$ as N-channel MOSFET's. However, it should be understood that in practice there can be any type of switching device (such as N or P channel MOSFET's, bipolar transistors or other such switching devices) that can be included in a given system such as exemplary BRU 300. Therefore, the present disclosure is not limited in the type or number of switching devices that can be included and supported by a system consistent with the present invention. In some embodiments, in order to further simplify implementation of BRU 500, switching devices $M_3$ and/or $M_4$ can be externally coupled to BRU 500.

Figure 6:
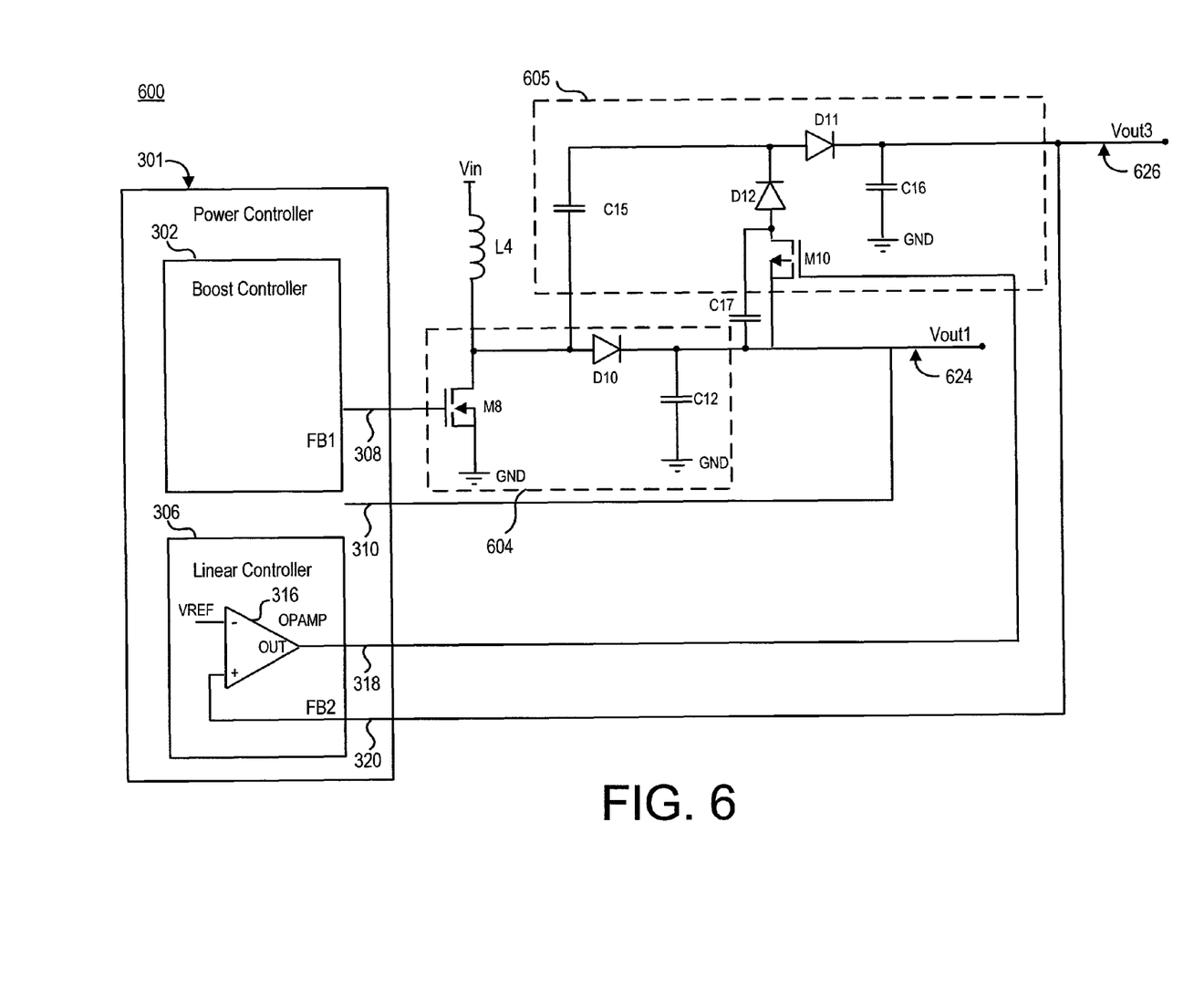

FIG. 6 illustrates a schematic diagram of an exemplary BRU 600 that can further optimize the regulation of positive output voltages of a charge pump circuit consistent with some embodiments of the present invention. As shown in FIG. 6, BRU 600 can include BC 302, LC 306, CPC 605 and BTC 604.

BTC 604 can include a switching device such as transistor $M_8$, diode $D_{10}$ and capacitor $C_{12}$. In some embodiments, BTC 604 can be similar if not identical to BTC 104 as discussed with respect to FIG. 2. As shown in FIG. 6, BC 302 can be coupled to the gate of transistor $M_8$ and to an output terminal 624 via control line 308 and feedback line 310, respectively. In a manner similar to that discussed with respect to FIG. 2, a first output voltage $V_{OUT1}$ generated across output terminal 624 (of CPC 604) can be regulated by BC 302. In some embodiments, first output voltage $V_{OUT1}$ can be similar if not identical to voltage \f$_{our}$ discussed with respect to FIG. 2.

CPC 605 can include a switching device such as transistor $M_{10}$, diodes $D_{11}$ and $D_{12}$, and capacitors $C_{15}$ and $C_{16}$ coupled together as shown in FIG. 6. As will be discussed in detail below, an output voltage $V_{OUT3}$ can be generated across an output terminal 626 (of CPC 605). In some embodiments, output voltage $V_{OUT3}$ can be generated such that:

$$V_{OUT3} = N \times V_{OUT1} \text{ (where N is a positive integer)}$$

As will be discussed in detail below, in some embodiments, a capacitor $C_{17}$ can be coupled between diodes $D_{10}$ and $D_{12}$ as shown in FIG. 6. By coupling capacitor $C_{17}$ as shown, transistor $M_{10}$ may not be exposed to output voltage $V_{OUT1}$. Because transistor $M_{10}$ may only be exposed to output voltage $V_{OUT3}$, the size of transistor $M_{10}$ can be reduced.

In some embodiments, BRU 600 can include LC 306 to further regulate output voltage $V_{OUT3}$ generated across output terminal 626. In a manner similar to that discussed with respect to FIG. 5, LC 306 can further include an operational amplifier 316 that can be coupled to receive a reference voltage $V_{REF}$ at its inverting input and second output voltage $V_{OUT3}$ at its non-inverting input (via feedback line 320).

As shown in FIG. 6, LC 306 can be coupled to the gate of transistor $M_4$ and output terminal 626 via control line 318 and a feedback line 320, respectively. As will be discussed in detail below, LC 306 can further control CPC 605 to regulate output voltage $V_{OUT3}$ generated across output terminal 526.

During normal operation, BC 302 can apply a control signal via control line 308 that can cause transistor $M_8$ to periodically turn on and/or off. In a manner similar to that discussed with respect to FIG. 2, the turning on of transistor $M_8$ can cause a current to flow from input voltage $V_{IN}$ through inductive element $L_4$ and transistor $M_8$ and down to GND. While transistor $M_8$ is on, inductive element $L_4$ can store the energy generated by the flow of current. The turning off of transistor $M_3$ can cause the voltage at the drain of transistor $M_8$ to increase which in turn can cause a charge to be transferred to capacitor $C_{12}$ via diode $D_{10}$. Diode $D_4$ can act like a valve that prevents charge transferred from transistor $M_8$ to capacitor $C_{12}$ from flowing backwards to transistor $M_8$. Therefore, by periodically controlling the operation of transistor $M_8$, a charge can build up in capacitor $C_{12}$ and output voltage $V_{OUT1}$ can be generated across output terminal 624. In a manner similar to that discussed with respect to FIG. 2, in some embodiments BC 302 can be configured to regulate output $V_{OUT1}$ generated across output terminal 624 such that voltage $V_{OUT1}$ can be held at a desired operating level.

Simultaneously, as voltage $V_{OUT1}$ is generated across capacitor $C_{12}$, LC 306 can control the operation of transistor $M_{10}$ by applying a control voltage signal (as discussed above) at the gate of transistor $M_{10}$ via control line 318. When transistor $M_{10}$ is turned on, a charge can build up across capacitor $C_{16}$ which in turn can result in output voltage $V_{OUT3}$ being generated via output terminal 626. Diodes $D_{12}$ and $D_{11}$ act like valves that prevent charge transferred from transistor $M_{10}$ to capacitor $C_{16}$ from flowing backwards to transistor $M_{10}$.

As can be seen in FIG. 6, because capacitor $C_{16}$ is exposed to output voltage $V_{OUT1}$, output voltage $V_{OUT3}$ generated across capacitor $C_{16}$ can have a magnitude that can be greater than voltage $V_{OUT1}$. As is shown in FIG. 6, voltage $V_{OUT3}$ can be further sensed by LC 306 via feedback line 320. Furthermore, LC 306 can regulate output voltage $V_{OUT3}$ by comparing voltage $V_{OUT3}$ with reference voltage $V_{REF}$ (via amplifier 316) and accordingly controlling the gate voltage across transistor $M_{10}$ (via control line 318). For example, if output voltage $V_{OUT3}$ falls below a desired level, LC 306 can sense this decrease via feedback line 320. In response to sensing a decrease in output voltage $V_{OUT3}$, LC 306 via amplifier 316 can control the voltage at the gate of transistor $M_{10}$ to increase the charge transferred to capacitor $C_{16}$. This action can in turn increase output voltage $V_{OUT3}$ to compensate for the initial drop in the output voltage. If, on the other hand, output voltage $V_{OUT3}$ rises above a desired level, LC 306 can sense this increase, and can accordingly control the voltage at the gate of transistor $M_{10}$ (via control line 318) to decrease the charge transferred to capacitor $C_{16}$. This action can in turn decrease output voltage $V_{OUT3}$ to compensate for the initial rise in the output voltage. In some embodiments, to further optimize voltage scaling, one or more feedback resistors and/or buffers can be coupled along feedback line 320.

For convenience, FIG. 6 depicts a switching devices $M_8$ and $M_{10}$ as N-channel MOSFET's. However, it should be understood that in practice there can be any type of switching device (such as N or P channel MOSFET's, bipolar transistors or other such switching devices) that can be included in a given system such as exemplary BRU 600. Therefore, the present disclosure is not limited in the type or number of switching devices that can be included and supported by a system consistent with the present invention. In some embodiments, in order to further simplify implementation of BRU 600, switching devices $M_8$ and/or $M_{10}$ can be externally coupled to BRU 600.

It should be understood that the various power controller units, Boost Controllers, and Linear Controllers depicted in FIGS. 1 through 6, can in practice, individually or in any combinations, be implemented in hardware, in software executed on one or more hardware components (such as one or more processors, one or more application specific integrated circuits (ASIC's) or other such components) or in any combination thereof.

Other embodiments will be apparent to those skilled in the art from consideration of the specification and practice disclosed herein. It is intended that the specification and examples be considered as exemplary only, with a true scope and spirit of the invention being indicated by the following claims.

What is claimed is:

1. A boost regulator system, comprising:
   a first pump element coupled to receive a first input voltage;
   a first switching device coupled to the first pump element, the first switching device further causing a finite amount of energy to be stored in the first pump element in response to a first control signal;
   a first capacitor coupled to the first pump element and the first switching device, the first capacitor further storing the finite amount of energy and generating a first output voltage in response to the finite amount of energy;
   a boost controller (BC) coupled to receive the first output voltage, the BC further configured to regulate the first output voltage by generating the first control signal;
   a second switching device coupled to a second capacitor, the second switching device further causing a second voltage to develop across the second capacitor in response to a second control signal;
   a third capacitor coupled to the first pump element and the second switching device, the third capacitor further generating a third output voltage in response to the finite amount of energy; and
   a linear controller (LC) coupled to receive the third output voltage, the LC further configured to regulate the third output voltage by generating the second control signal.

2. The system of claim 1 wherein the first pump element is an inductive element.

3. The system of claim 1 wherein the first input voltage is a AC or DC voltage.

4. The system of claim 1 wherein at least one of the first switching device and the second switching device is a N-channel MOSFET.

5. The system of claim 1 wherein at least one of the first switching device and the second switching device is a P-channel MOSFET.

6. The system of claim 1 wherein at least one of the first switching device and the second switching device is a bipolar junction transistor.

7. The system of claim 1 wherein at least one of the first control signal and the second control is a frequency modulated signal.

8. The system of claim 1 wherein at least one of the first control signal and the second control is a pulse modulated signal.

9. The system of claim 1 wherein at least one of the first control signal and the second control is a voltage signal.

10. The system of claim 1 wherein the BC and LC are included in a single power control unit (PCU).

11. The system of claim 1 wherein at least one of the first output voltage and the second output voltage is a negative voltage.

12. A boost regulator system, comprising:
    a first pump element coupled to receive a first input voltage;
    a first switching device coupled to the first pump element, the first switching device further causing a finite amount of energy to be stored in the first pump element in response to a first control signal;
    a first capacitor coupled to the first pump element and the first switching device, the first capacitor further storing the finite amount of energy and generating a first output voltage in response to the finite amount of energy;
    a boost controller (BC) coupled to receive the first output voltage, the BC further configured to regulate the first output voltage by generating the first control signal;
    a second capacitor coupled to the first pump element;
    a second switching device coupled to the first capacitor and the second capacitor, the second switching device further causing a second output voltage to develop across the second capacitor in response to a second control signal; and
    a linear controller (LC) coupled to receive the second output voltage, the LC further configured to regulate the second output voltage by generating the second control signal.

13. The system of claim 12 wherein the first pump element is an inductive element.

14. The system of claim 12 wherein the first input voltage is a AC or DC voltage.

15. The system of claim 12 wherein at least one of the first switching device and the second switching device is a N-channel MOSFET.

16. The system of claim 12 wherein at least one of the first switching device and the second switching device is a P-channel MOSFET.

17. The system of claim 12 wherein at least one of the first switching device and the second switching device is a bipolar junction transistor.

18. The system of claim 12 wherein at least one of the first control signal and the second control is a frequency modulated signal.

19. The system of claim 12 wherein at least one of the first control signal and the second control is a pulse modulated signal.

20. The system of claim 12 wherein at least one of the first control signal and the second control is a voltage signal.

21. The system of claim 12 wherein the BC and LC are included in a single power control unit (PCU).

22. The system of claim 12 wherein at least one of the first output voltage and the second output voltage is a positive voltage.

23. The system of claim 12 wherein the second output voltage is greater in magnitude than the first output voltage.

* * * * *